United States Patent
Yanagisawa et al.

(10) Patent No.: US 9,713,171 B2
(45) Date of Patent: Jul. 18, 2017

(54) SELECTING WHITE SPACE FREQUENCY BASED ON PREAMBLE CYCLE LENGTH

(71) Applicant: Hitachi Kokusai Electric Inc., Tokyo (JP)

(72) Inventors: Kei Yanagisawa, Tokyo (JP); Masayuki Takekawa, Tokyo (JP); Keigo Hasegawa, Tokyo (JP)

(73) Assignee: Hitachi Kokusai Electric Inc., Tokyo (JP)

(*) Notice: Subject to any disclaimer, the term of this patent is extended or adjusted under 35 U.S.C. 154(b) by 0 days.

(21) Appl. No.: 15/021,383

(22) PCT Filed: Sep. 5, 2014

(86) PCT No.: PCT/JP2014/073450
§ 371 (c)(1),
(2) Date: Mar. 11, 2016

(87) PCT Pub. No.: WO2015/041068
PCT Pub. Date: Mar. 26, 2015

(65) Prior Publication Data
US 2016/0227584 A1 Aug. 4, 2016

(30) Foreign Application Priority Data
Sep. 20, 2013 (JP) .................................. 2013-195312

(51) Int. Cl.
*H04W 16/14* (2009.01)
*H04W 24/02* (2009.01)
(Continued)

(52) U.S. Cl.
CPC ....... *H04W 74/0833* (2013.01); *H04W 16/14* (2013.01); *H04W 24/02* (2013.01);
(Continued)

(58) Field of Classification Search
CPC ..... H04W 84/12; H04W 16/14; H04W 24/02; H04W 48/16; H04W 88/08; H04W 8/005;
(Continued)

(56) References Cited

U.S. PATENT DOCUMENTS

2009/0252178 A1 10/2009 Huttunen et al.
2013/0059543 A1 3/2013 Kiukkonen et al.
(Continued)

FOREIGN PATENT DOCUMENTS

JP 2005-204254 A 7/2005
JP 2012-147216 A 8/2012

OTHER PUBLICATIONS

International Search Report from International Application No. PCT/JP2014/073450 mailed Nov. 25, 2014.
(Continued)

*Primary Examiner* — Philip Sobutka
(74) *Attorney, Agent, or Firm* — Brundidge & Stanger, P.C.

(57) ABSTRACT

Provided is a wireless communication system that is capable of preventing interference between secondary use systems that do not use a database. The wireless communication system uses a white space for opposing communication between a base station and a terminal station.

At startup, the base station transmits a preamble over a cycle that is n-times a frame length (where n is an integer 2 or greater), changes a set frequency channel if ranging is not detected from a terminal station within a fixed time interval, and begins normal operation using the set frequency channel if ranging is detected.

At startup, the terminal station detects a preamble within a received signal, changes a set frequency channel if a peak is detected at each frame length, and transmits a ranging signal
(Continued)

Schematic configuration diagram of the secondary use system if peaks are detected for cycles that are n-times the frame length and peaks are not detected for other cycles.

8 Claims, 7 Drawing Sheets

(51) Int. Cl.
H04W 48/16 (2009.01)
H04W 76/02 (2009.01)
H04W 88/02 (2009.01)
H04W 74/08 (2009.01)

(52) U.S. Cl.
CPC ........... H04W 48/16 (2013.01); H04W 76/02 (2013.01); H04W 88/02 (2013.01)

(58) Field of Classification Search
CPC ......... H04W 52/0225; H04W 74/0833; H04W 76/023; H04W 72/0446; H04W 74/002; H04W 74/08; H04W 74/0808; H04W 76/02

USPC ................ 455/454, 450, 456.1, 411, 447, 62
See application file for complete search history.

(56) References Cited

U.S. PATENT DOCUMENTS

| | | | |
|---|---|---|---|
| 2013/0315152 A1* | 11/2013 | Ratasuk .............. | H04W 76/023 370/329 |
| 2014/0016653 A1* | 1/2014 | Oh ...................... | H04W 56/001 370/474 |
| 2015/0139115 A1* | 5/2015 | Seok ................ | H04W 72/0453 370/329 |

OTHER PUBLICATIONS

K. Muraoka, et al., "B-17-2 Cognitive Musen ni Okeru Saidai Shuki Jiko Sokan Sentaku ni Motozuka Spectrum Sensing", 2008 Nen IEICE Communications Society Conference Koen Ronbunshu 1, Sep. 2, 2008, p. 445.

* cited by examiner

Configuration of wireless communication system as in embodiment

Illustrative diagram indicating the configuration of the radio communication frame using this wireless communication system

FIG. 4(a)

Example for detecting a preamble signal. The case that only the base station for the preceding entry system is existing near the terminal station.

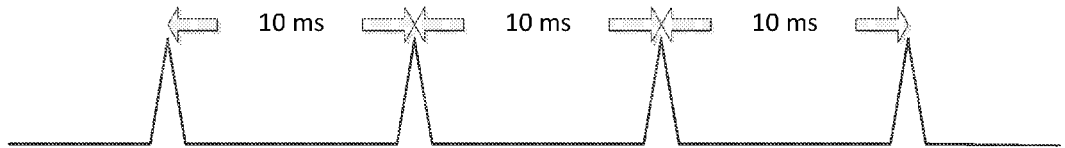

The terminal station detects a peak signal every 10 ms.

FIG. 4(b)

Example for detecting a preamble signal. The case that only the base station for the new entry system is existing near the terminal station.

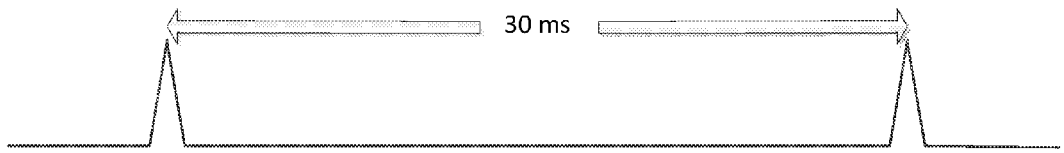

The terminal station detects a peak signal every 10 ms.

FIG. 4(c)

Example for detecting a preamble signal. The case that only the base station for the preceding entry system and the base station for the new entry system are existing near the terminal station

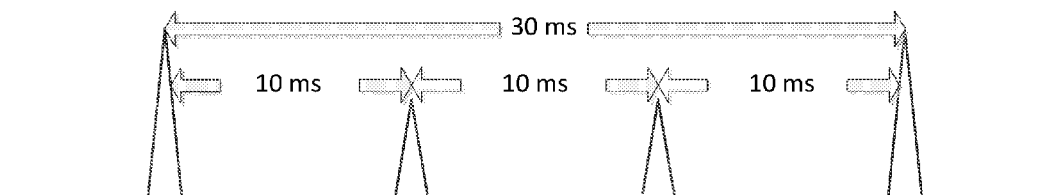

The terminal station detects a peak signal every 10 ms, and detects a stronger peak signal every 30 ms.

Configuration block diagram for a preamble detecting circuit

Schematic configuration diagram of the secondary use system

SELECTING WHITE SPACE FREQUENCY BASED ON PREAMBLE CYCLE LENGTH

TECHNICAL FIELD

The present invention relates to a wireless communication system using white space. More specifically, the present invention relates to a wireless communication system and a wireless communication method, being capable of reducing interference between secondary use systems, which are not using databases.

BACKGROUND ART

Description of Prior Art: FIG. 7

There is a wireless communication system that utilizes white space to effectively use a frequency spectrum. For example, it is referred to in Patent Literature 1 or Non Patent Literature 1 (See section labeled 'Related Art' below."). The wireless communication system that utilizes white space includes a preceding wireless system that is using a licensed frequency (a primary use system), and a secondary use system that is using a frequency which is not used by the primary use system (white space) temporarily or in a limited area.

The configuration diagram of the wireless communication system, being operated as the secondary use system, having a database for managing the assignment of frequencies, will be explained by using FIG. 7. FIG. 7 depicts a schematic configuration diagram of the wireless communication system having the database. As depicted in FIG. 7, the wireless communication system using the database includes database 1, frequency channel manager 2, base station 3 and terminal station 4.

In the wireless communication system mentioned above, database 1 has been storing the frequency channel information or transmission power information, which is available for a secondary use. In a start of the communication, frequency channel manager 2 accesses database 1 via the Internet, then gets a frequency channel list including the information regarding available channels, according to the location information (the latitude and longitude information) of base station 3 or terminal station 4. Then, frequency channel manager 2 selects a frequency channel to use for communication from the information regarding available channels in the frequency channel list, and informs base station 3 of the frequency channel.

Thereby, base station 3 can communicate with terminal station 4 using the frequency channel selected by frequency channel manager 2, terminal station 4 can communicate with base station 3 using the frequency channel received from base station 3 as a downlink signal.

In the wireless communication system using such databases, frequency channel manager 2 is necessary for every base station 3, therefore, the scale of the system may be enlarged.

Furthermore, where base station 3 can be installed temporarily in case of a disaster, the Internet connection may not be usually available depending on the location etc.

In that case, as frequency channel manager 2 cannot access database 1, frequency channel manager 2 cannot get the frequency channel list including available channel information.

For the system which does not use database 1, base station 3 and terminal station 4 select an available frequency channel by using a spectrum sensing technology.

[Preset for the Frequency Channel]

When the broadcast for television system can be only considered as the primary use system and there can be a geographical limitation regarding the area covered by the secondary use system, it may be possible that the guaranteed frequency channel which may not interfere with a primary use system in the area, are previously set (preset) to base station 3 and terminal station 4 in the secondary use system.

By presetting the frequency channel, the operation of secondary use system may be enabled without referring to database 1 or sensing strictly. In addition, when there are a plurality of secondary use systems, an available frequency channel can be assigned to each system, respectively, so that using the frequency channel does not repeat each other.

[Operation in Case of a Disaster]

The wireless communication system using white space is expected as a substitute line in the situation of trouble for a general communication line, or as an emergency or mobile communication line in the situation of a disaster. For example, by installing mobile base station 3 and mobile terminal station 4 in two spots that each perform broadband communication, Point to Point communication is considered.

However, for example, in the case that a plurality of secondary use systems using the same preset frequency channel brought into the same geographical domain in a disaster, and when the secondary use system entered in later (hereinafter, "a new entry system"), starts communication using a frequency channel which is the same as the frequency channel which had been using a preceding secondary use system (hereinafter, "a preceding entry system"), the new entry system may interfere with the preceding entry system until the new entry system recognizes the existence of the preceding entry system.

Particularly, in the situation that frequency channel manager 2 cannot access database 1, since both secondary use systems are going to use safer frequency channels so as not to interfere with the primary use system, the probability of using the same secondary frequency channel between secondary use systems in the neighborhood may increase.

When terminal station 4 that belongs to the new entry system enters the communication area of the preceding entry system, terminal station 4 conducts a sensing for detecting a radio station that belongs to the preceding entry system. Then terminal station 4 informs a base station 3 that belongs to the new entry system of the existence of the radio station. However, to inform base station 3 of the existence of the radio station, it is necessary for terminal station 4 to conduct a ranging process, an authentication process, or a registration process so as to inform base station 3 of the existence of the radio station. Therefore, the communication of the above mentioned processes may become interference on the preceding entry system using a same frequency channel.

In addition, terminal station 4 that belongs to the new entry system may try to communicate with or initialize base station 3 that belongs to the preceding entry system. Though it may be possible that terminal station 4 is set so as to judge whether base station 3 is an appropriate station to communicate with, based on the BS_ID (Base Station MAC address) included in Superframe Control Header (SCH) received from base station 3, it may be difficult to request such a setting from an end user and it may be a lack in flexibility for use.

Therefore, based on at least the ranging process between base station 3 that belongs to the preceding entry system and terminal station 4 that belongs to the new entry system, it is necessary to have terminal station 4 recognize a connection failure. In the meantime, as terminal station 4 cannot communicate with the proper base station 3 that the terminal station 4 ordinarily communicates with, an establishment of communication under the new entry system may be delayed.

Related Art

Related arts for a wireless communication system using white space are as follows:
Patent Literature 1, Japanese Patent Application Laid-Open Publication No. 2012-147216, "MANAGEMENT APPARATUS", NATIONAL INSTITUTE OF INFORMATION & COMMUNICATION TECHNOLOGY
Patent Literature 2, Japanese Patent Application Laid-Open Publication No. 2005-204254, "RADIO BASE STATION. RADIO TERMINAL STATION, AND RADIO COMMUNICATION METHOD", TOSHIBA CORP
Non Patent Literature 1, Cognitive Wireless RAN Medium Access Control (MAC) and Physical Layer (PHY) Specifications: Policies and Procedures for Operation in the TV Bands (IEEE Std 802.22-2011 Part 22)

Patent Literature 1 may disclose management apparatus, self-coexisting by using a same frequency channel between similar plural secondary systems, based on the information of an adjacent secondary system in the wireless communication system using white space.

Patent Literature 2 may disclose a base station which can modify the time interval for the transmission of synchronizing signal, depending on the state of the network in the radio communication system, which the base station and a plurality of terminal stations are communicating using same frequency channel.

Non Patent Literature 1 may disclose the function of Medium Access Control (MAC) including "On Demand Channel Contention" etc. for self-coexisting using a same frequency channel between similar plural secondary systems.

PRIOR ART DOCUMENTS

Patent Literature

Patent Literature 1, Japanese Patent Application Laid-Open Publication No. 2012-147216
Patent Literature 2, Japanese Patent Application Laid-Open Publication No. 2005-204254

Non Patent Literature 1

Non Patent Literature 1, Cognitive Wireless RAN Medium Access Control (MAC) and Physical Layer (PHY) Specifications: Policies and Procedures for Operation in the TV Bands (IEEE Std 02.22-2011 Part 22)

SUMMARY OF INVENTION

Technical Problem

As described above, in the wireless communication system used as a conventional secondary use system, in the situation of a disaster that frequency channel manager 2 cannot access database 1 when the plurality of wireless communication systems which the same frequency channel was preset respectively are brought in the specific region, there is a problem that the new entry system may interfere in the preceding entry system.

Patent Literature 1 and 2 do not disclose the following procedures:

At startup, the base station transmits a preamble signal at the cycle of n-times the length of a frame (where n is an integer 2 or greater). The terminal station transmits a ranging signal in just the case that the terminal station detects the preamble signal at the cycle of n-times of the length of a frame in a received signal. The base station changes the frequency channel when the base station does not detect the ranging signal within the prescribed time.

The present invention is made in view of the above-described circumstances, and an object of the present invention is to provide a wireless communication system and a wireless communication method, capable of avoiding interference between the secondary use systems which do not use databases.

Solution to Problem

To solve the problem of a conventional technology, a wireless communication system using white space that performs wireless communication between a base station and a terminal station, the base station communicates with the terminal station in a one to one response, is disclosed.

A base station communicates with a terminal station using Superframe which is comprised of a plurality of frames.

In a startup process after starting the supply of electric power, the base station selects a frequency channel in a list of available frequency channels which has been stored in the memory beforehand. Then, the base station transmits preambles at the cycle of n-times the length of a frame (where n is an integer 2 or greater). After the base station starts the transmission of preambles under the cycle, when the base station does not detect ranging signals from the terminal station that corresponds to the base station for a prescribed time, the base station changes the frequency channel. In a prescribed time, when the base station detects ranging signals being transmitted from the terminal station corresponding to the base station, the base station starts communicating with the terminal station by transmitting preambles at the cycle of the length of a frame.

In a startup process after starting the supply of electric power, the terminal station selects a frequency channel in a list of available frequency channels which has been stored in the memory beforehand. The terminal station seeks a preamble signal in a received signal at the selected frequency channel. When the terminal station detects preambles at the cycle of the length of a frame, the terminal station selects the other frequency channel. When the terminal station does not detect preambles at the cycle of the length of a frame and detects preambles at the cycle of n-times the length of a frame, the terminal station transmits a ranging signal with the selected frequency channel.

This invention also includes the following characterized features in the wireless communication system mentioned above.

According to a received signal in a preset frequency channel, the base station seeks a base station or a terminal station that belongs to a preceding entry system. When the base station does not detect a base station or a terminal station that belongs to the preceding entry system, the base station starts transmitting preambles at the cycle of n-times of the length of a frame. When the base station detects a base station or a terminal station that belongs to the preceding entry system, the base station changes the current frequency channel to the other frequency channel.

This invention also includes the following characterized features in the wireless communication system mentioned above.

The terminal station seeks a terminal station that belongs to a preceding entry system. When the terminal station does not detect a terminal station that belongs to the preceding entry system, the terminal station transmits a ranging signal. When the terminal station detects a terminal station that belongs to the preceding entry system, the terminal station selects the other frequency channel.

Advantageous Effects of Invention

According to this invention, a wireless communication system using white space, that performs wireless communication between a base station and a terminal station, the base station communicates with the terminal station in a one to one response, is disclosed.

A base station communicates with a terminal station using a Superframe which is comprised of a plurality of frames.

In a startup process after starting the supply of electric power, the base station selects a frequency channel in a list of available frequency channels which has been stored in the memory beforehand. Then the base station transmits preambles at the cycle of n-times the length of a frame (where n is an integer 2 or greater). In a prescribed time, when the base station does not detect ranging signals from the terminal station that corresponds to the base station, the base station changes the current frequency channel to the other frequency channel. In a prescribed time, when the base station detects ranging signals from the terminal station that corresponds to the base station, the base station starts communicating with the terminal station by transmitting preambles at the cycle of the length of a frame.

In a startup process after starting the supply of electric power, the terminal station selects a frequency channel in a list of available frequency channels which has been stored in the memory beforehand. Then, the terminal station seeks the preamble signal in a received signal at the selected frequency channel. When preambles at the cycle of the length of a frame have been detected at the terminal station, the terminal station changes the current frequency channel to the other frequency channel. When preambles at the cycle of the length of a frame have not been detected and preambles at the cycle of n-times the length of a frame have been detected at the terminal station, the terminal station transmits ranging signals at the frequency channel which is currently being used.

Therefore, the terminal station can distinguish the base station that belongs to the preceding entry system and the new entry system. The wireless communication system can perform the wireless communication without interfering with the preceding entry system, by a simple configuration without using a database or a frequency channel manager.

In addition, according to this invention, the base station seeks a base station or a terminal station that belongs to a preceding entry system by analyzing a received signal in a preset frequency channel. When the base station does not detect a base station or a terminal station that belongs to a preceding entry system, the base station starts transmitting preamble signals at the cycle of n-times the length of a frame. When the base station detects a base station or a terminal station that belongs to the preceding entry system, the base station changes the current frequency channel to the other frequency channel.

Therefore, the base station can surely prevent the base station applying interference to the preceding entry system.

In addition, according to this invention, the terminal station seeks a terminal station that belongs to a preceding entry system. When the terminal station does not detect a terminal station that belongs to the preceding entry system, the terminal station transmits a ranging signal. When the terminal station detects a terminal station that belongs to the preceding entry system, the terminal station changes the frequency channel to the other frequency channel Therefore, the terminal station can surely prevent the terminal station applying interference to the preceding entry system.

BRIEF DESCRIPTION OF DRAWINGS

FIG. 4 is an illustrative diagram indicating an overview of the process for detecting a preamble signal in terminal station 4 in this wireless communication system.

DESCRIPTION OF EXEMPLARY EMBODIMENTS

Figure 1:
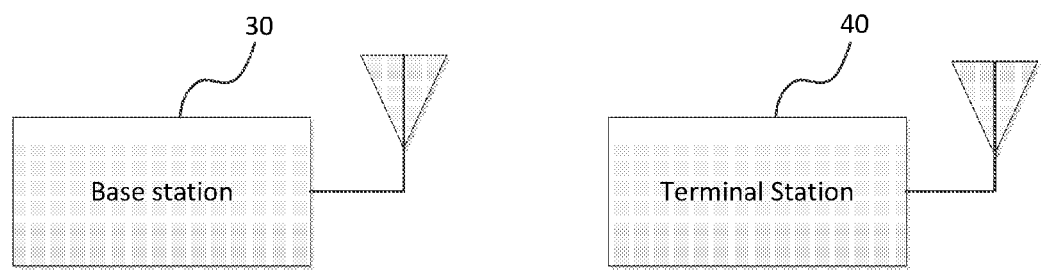
FIG. 1 is a schematic configuration diagram of the wireless communication system according to the exemplary embodiment of the present invention.

An exemplary embodiment of the present invention will be described with reference to the drawings.

Overview of Embodiment

According to the exemplary embodiment of the present invention, the wireless communication system performs wireless communication using white space between a base station and a terminal station in a one to one response to.

In the startup process, the base station selects one of the frequency channels which were previously stored in a memory. To judge for the existence of a preceding entry system in the neighborhood, the base station monitors preambles or ranging signals for a prescribed time. When the base station detects preambles or ranging signals, the base station changes the frequency channel to the other frequency channel. When the base station does not detect preambles or ranging signals, the base station shifts its operation to the following process for transmitting preambles.

As the process for transmitting preambles, the base station transmits preambles at the cycle of n-times the length of a frame until the base station establishes a communication link with the terminal station (where n is an integer 2 or greater).

Therefore, the terminal station can distinguish a base station that belongs to a new entry system and a preceding entry system.

When the base station does not detect a ranging signal from the corresponding terminal station within the prescribed time, the base station changes the frequency channel to the other frequency channel. When the base station detects a ranging signal within the prescribed time, the base station starts normal operation using the current frequency channel.

Therefore, the wireless communication system can perform the wireless communication without interfering with the preceding entry system by a simple configuration without using a database or a frequency channel manager.

In addition, according to the exemplary embodiment of the present invention, in a startup process of the terminal station, the terminal station selects the frequency channel which was preset, then the terminal station seeks a preamble signal in a receiving signal of the frequency channel.

When the terminal station detects a peak at each time-position of the length of a frame, the terminal station determines that there is a base station that belongs to the preceding entry system, therefore the terminal station changes the current frequency channel to the other frequency channel. When the terminal station detects peaks at the cycle of n-times the length of a frame, and does not detect peaks at the other cycles, the terminal station determines that it is possible to communicate with a base station that belongs to a new entry system, therefore the terminal station starts transmitting ranging signals and shifts its operation to the normal communication.

As the terminal station can distinguish a radio station that belongs to a preceding entry system and a base station that belongs to a new entry system, the wireless communication system can perform the wireless communication without interfering with a preceding entry system, with a simple configuration.

Schematic Configuration of the Wireless Communication System According to the Embodiment: FIG. 1

FIG. 1 is a schematic configuration diagram of the wireless communication system according to the exemplary embodiment of the present invention. As depicted in FIG. 1, a wireless communication system according to the exemplary embodiment of the present invention (this system) includes base station 30 and terminal station 40. This system may not have database 1 or frequency channel manager 2 which may be included in a conventional secondary use system. For example, this system may be configured as a movable system. Even in a location where there is no Internet connection such as in a disaster, this system allows base station 30 and terminal station 40 to communicate with each other autonomously.

In addition, base station 30 or terminal station 40 may include a communication part which performs a signal processing for radio communication and a controller which controls base station 30 or terminal station 40. The controller also has a memory unit for storing various kinds of programs or parameters.

The processes at the startup in base station 30 and terminal station 40 (in other words, the processes from switching on the power source to establish communication) are different from the conventional processes, respectively. The processes at the startup will be described later. One or more frequency channels which are available to use are preset beforehand in base station 30 and terminal station 40, respectively. They are stored as a list of available frequency channels.

Figure 7:
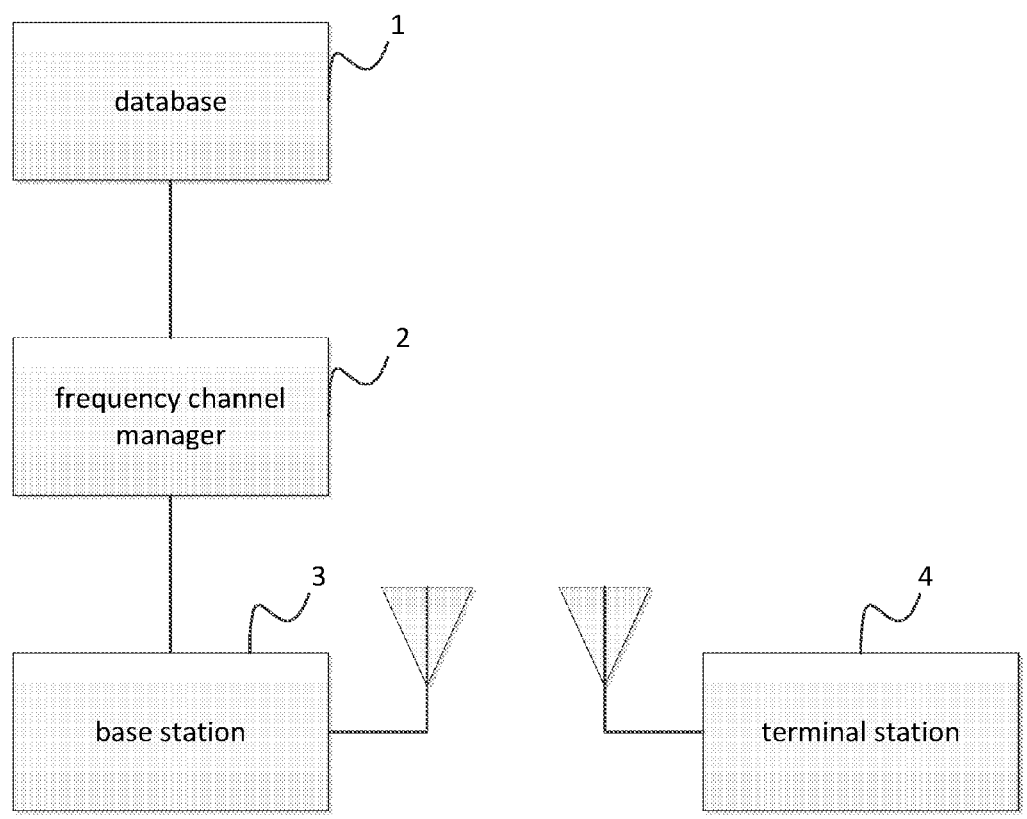
FIG. 7 depicts a schematic configuration diagram of the wireless communication system having the database.

As another configuration of this system, though outline of the hardware configuration may be same as the configuration depicted in FIG. 7, it may be possible that this system operates under the situation that base station 3 does not access database 1 or frequency channel manager 2.

In such a case, the system may be substantially configured by just base station 3 and terminal station 4, but can establish a communication area autonomously.

Considering the other configuration, in addition to the conventional processes which can access database 1, base station 3 or terminal station 4 can include the same processes at base station 30 or terminal station 40 in this system. In such a case, base station 3 and terminal station 4 can be configured so as to select the operational mode including the process whether they access database or not, respectively. The operational modes of the base station 3 and terminal station 4 can be specified by each operator of the base station 3 and terminal station 4.

Figure 2:
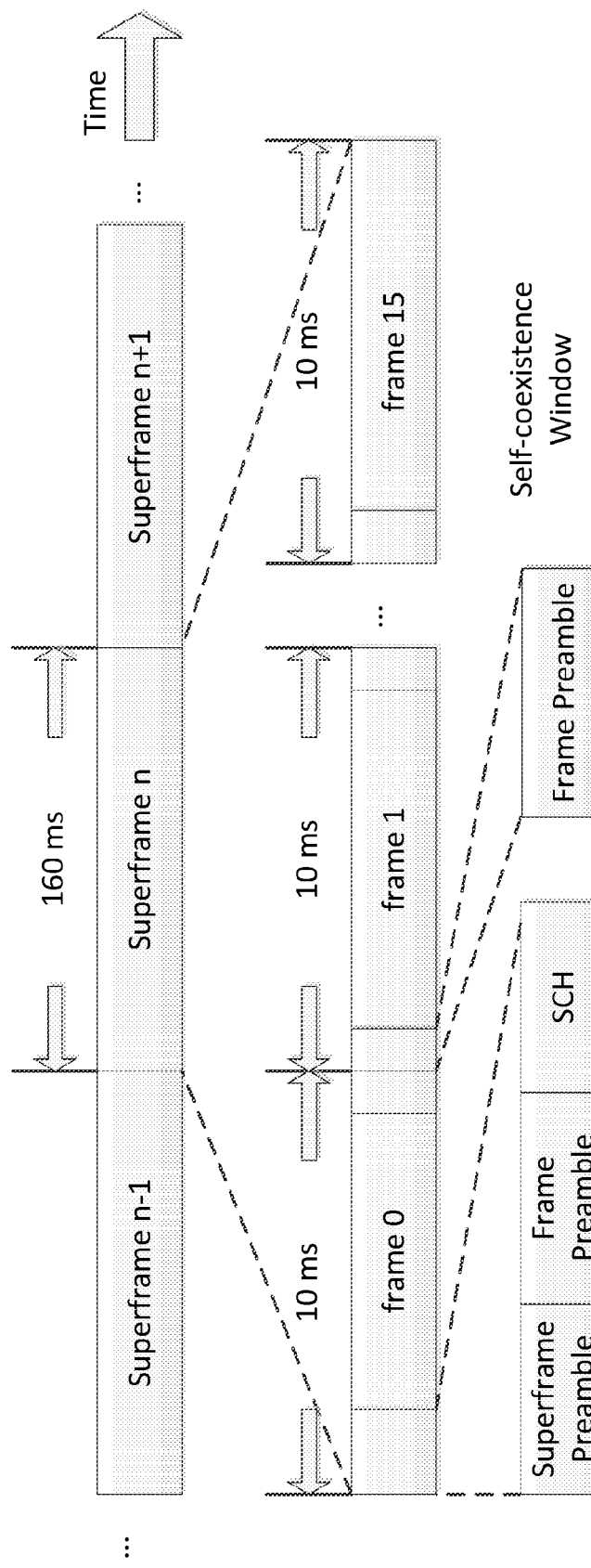
FIG. 2 is an illustrative diagram indicating the configuration of the radio communication frame using this wireless communication system.

Configuration of the Frame: FIG. 2

In this embodiment, a wireless communication system which can apply to the system, standardized by IEEE 802.22, will be explained. Before explaining processing of base station 30 or terminal station 40, the configuration of the radio frame of IEEE 802.22 is explained by referring FIG. 2. FIG. 2 is an illustration indicating the configuration of the radio communication frame of this system. As depicted in FIG. 2, the radio communication frame using the wireless communication system under IEEE 802.22 is configured by Superframe having a period of 160 ms a unit. Superframe is configured by sixteen (16) frames (frame 0 to frame 15), each frame has a period of 10 ms.

Each frame is comprised in order of a downlink subframe, an uplink subframe, and a self-coexistence window (not essential). Each frame has the length for 24-41 symbols for Orthogonal Frequency Division Multiplexing (OFDM). The number of OFDM symbols in one frame depends on the bandwidth or Cycle Prefix (CP).

Preamble is allocated at the top of the downlink subframe, following the preamble, MAP indicating the positions of burst signals in downlink or uplink signals, Frame Control Header (FCH) etc. are allocated. Following Preamble, MAP, a plurality of downlink burst signals may be allocated at the frequency order. These downlink burst signals may be exactly allocated at the subchannel order on MAC. FCH includes the information regarding the length of a frame, or the length of MAP information etc. The preamble is known information between radio stations (in other words, it is known information between base station 30 and terminal station 40), being used for synchronizing or identifying each other.

In addition, in the frame allocated at the top of a Superframe, a Superframe Preamble is allocated in front of the position of the preamble of the first frame. Superframe Control Header (SCH) is allocated after the position of Frame preamble.

Though base station 30 may usually transmit preambles at the cycle of the length of a frame in the startup process, base station 30 can also transmit preambles at the cycle of n-times the length of a frame in this system (where, n is an integer 2 or greater). This will be described later.

Figure 3:
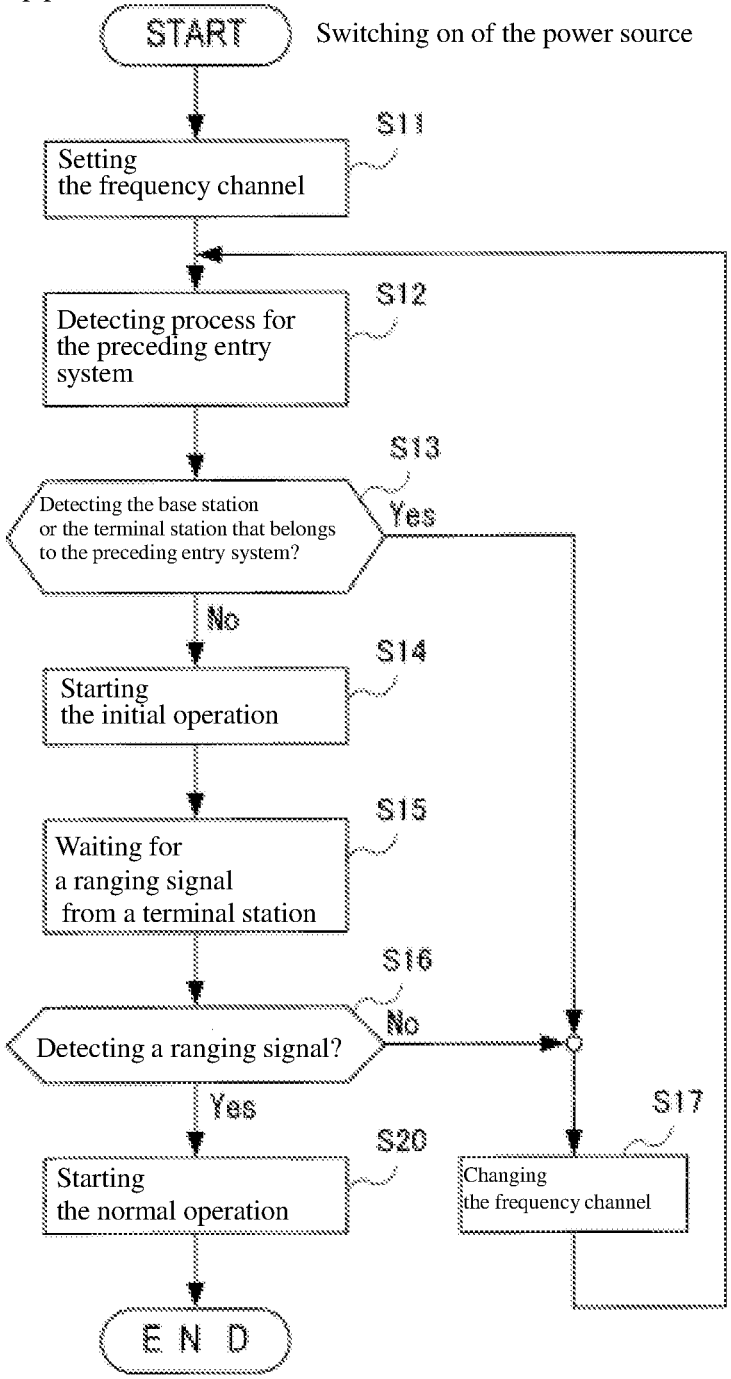
FIG. 3 is a flowchart indicating a startup process in the base station in this wireless communication system.

Startup Process in the Base Station: FIG. 3

Next, a startup process in the base station will be explained by referring to FIG. 3. FIG. 3 is a flowchart indicating a startup process in the base station in this wireless communication system. Base station 30 in this system may perform the initializing process described at section 7.14.1 BS initialization in Non Patent Literature 1. Here, we explain briefly with extracted characteristic parts.

The processes illustrated in FIG. 3 may be performed in control unit in base station 30.

As illustrated in FIG. 3, after switching on the power source, base station 30 initially sets a frequency channel (The step of S11). The frequency channel is selected from among a list of available frequency channels which were stored in memory beforehand.

Next, as a detecting process for a preceding entry system, base station 30 checks whether there is a base station or a terminal station that belongs to a preceding entry system in the neighborhood (The step of S12). Specifically, base station 30 has detected a radio signal under the frequency channel which had been preset, and has been measuring its Received Signal Strength Indicator (RSSI). When the measured value of the RSSI is more than a prescribed value, base station 30 determines that there may be a preceding entry system in the neighborhood.

In addition, when the preceding entry system is the same type of this system by calculating a cross-correlation between the receiving signal and known (fixed) preamble or by calculating auto-correlations of the receiving signals, it is possible that base station 30 detects some preambles. Then, Received WRAN Signal Strength (RSSL), which is the electricity for the specific transmission source, can be calculated. In the wireless communication based on IEEE 802.22 standard, as the symbol patterns are configured by specific structures so that the same time-waveforms are repeated four (4) times (if including CP, five (5) times) within a period of ten (10) Frequency Division Multiplexing (FDM) symbol-times in Superframe Preambles, or repeated two (2) times in Frame Preambles, a peak of the autocorrelation can be detected by operating the correlation in predetermined time lag.

In addition, according to the provisions of "10.3.2 Procedure SSA_Initialization" as generally described in Non Patent Literature 1, base station 30 can try to receive preambles of Co-Existence Beacon Protocol (CBP) bursts. By combining these methods, base station 30 in this system can precisely judge the existence of a base station or a terminal station that belongs to the same type of this system. The detection of the preamble signal is performed in the preamble detection circuit described later.

Then, based on the state of detection of preambles, base station 30 judges the existence of a base station or a terminal station that belongs to a preceding entry system (The step of S13). In the state that base station 30 has been detecting preambles at a regular interval, for example every 10 ms, with each of the signal strength higher than a predetermined signal strength, base station 30 determines that there may be a base station or a terminal station that belongs to a preceding entry system in the neighborhood (The judgment result of the step of S13 is "Yes" in FIG. 3). In this state, base station 30 will shift its procedure to the process for changing frequency channels so as to set the other frequency channel (The step of S17).

In the process for changing frequency channels (The step of S17), base station 30 can preferentially select another frequency channel which has not been used, from the list of available frequency channels. Then, base station 30 sets the selected frequency channel for the communication. Then, the procedure in base station 30 goes back to the step of S12, detecting process for the preceding entry system.

When a base station or a terminal station that belongs to a preceding entry system is not detected in the process S13 (The judgment result of the step of S13 is "No" in FIG. 3), base station 30 starts an initial operation (The step of S14).

Here, in base station 30 the period before normal operation being enabled from the state that base station 30 started receiving ranging signals from terminal station 40 is defined as the initial operation. As a characteristic of this system, base station 30 transmits preambles intermittently in the period of the initial operation.

In addition, Superframe Preambles are transmitted at the top positions of the Superframes, same as the conventional configuration.

In this system, the transmission cycle of the preambles can be set for the cycle of n-times the length of a frame, where n is an integer 2 or greater. Here, the length of a frame is 10 ms. For example, the transmission cycle of the preambles can be set for the cycle of three (3) times the length of a frame. In other words, base station 30 can transmit preambles at the cycle of 30 ms (once every 3 frames).

By changing the transmission cycle of the preambles in base station 30, terminal station 40 can distinguish base station 30 that belongs to this system, from a base station that belongs to a preceding entry system.

The top position of the frame which does not include the preamble can be transmitted under the situation that the position is filled by null or another preamble that is newly defined so as not to be detected by the terminal station 40. Or it may be possible that base station 30 does not transmit such a frame that the top position of the frame does not include the preamble.

Then, base station 30 waits for a ranging signal (RNG-REQ) from terminal station 40 (The step of S15), then judges whether base station 30 has detected a ranging signal from terminal station 40 within a prescribed period of time (The step of S16).

When base station 30 does not detect ranging signals from terminal station 40 for a prescribed time (The judgment result of the step of S16 is "No" in FIG. 3), base station 30 determines that terminal station 40 cannot communicate with base station 30 using current frequency channel, then the control procedure will shift to the step of S17 to change the frequency channel.

In the step of S16, when base station 30 detects ranging signals from terminal station 40 (The judgment result of the step of S16 is "Yes" in FIG. 3), base station 30 determines that the communication between base station 30 and terminal station 40 is established with using current frequency channel, then initiates the general operation. In the general operation, a preamble may be transmitted at every frame as shown in FIG. 2.

In this way, a startup process in the base station of this system may be executed.

Detecting a Preamble Signal in Terminal Station 40: FIG. 4

Next, the outline of detecting preambles in terminal station 40 will be described using FIG. 4. FIG. 4 is an illustrative diagram indicating an overview of the process for detecting a preamble signal in terminal station 40 in this wireless communication system. As mentioned above, during only the initial operation in base station 30 for newly entering the wireless communication system using white space, base station 30 transmits preambles at the cycle of n-times the length of a frame (where n is an integer 2 or greater, for example, at the cycle of three (3) times the length of a frame) Thereafter, when base station 30 shifts its operational status to the general operation, base station 30 transmits preambles at the cycle of the length of a frame.

Therefore, as depicted in FIG. 4(a), in the situation that just a base station that belongs to a preceding entry system exists near terminal station 40, peaks at the cycle of the length of a frame may appear. For example, peaks at the cycle of 10 ms may appear.

As depicted in FIG. 4(b), in the situation that just base station 30 that belongs to a new entry system exists near terminal station 40, peaks at the cycle of three (3) times the length of a frame may appear.

As depicted in FIG. 4(c), in the situation that both a base station that belongs to a preceding entry system and base station 30 that belongs to the new entry system exist near terminal station 40, respectively, though peaks at the cycle of the length of a frame may appear. Furthermore, under the condition that both base stations are synchronized, strong peaks at the cycle of n-times (here, three (3) times) the length of a frame may appear.

According to these procedures, terminal station 40 can calculate an autocorrelation from the received preambles, then, based on the signal positions and signal strength of preambles, terminal station 40 can judge the existence of a base station that belongs to a preceding entry system or the existence of a base station that belongs to a new entry system.

Specifically, when terminal station 40 detects the peaks as illustrated in FIG. 4(a) or FIG. 4(c), terminal station 40 changes the frequency channel because there may be a base station that belongs to a preceding entry system. When terminal station 40 just detects the peaks as illustrated in FIG. 4(b), terminal station 40 can establish the communication link with base station 30 that belongs to the new entry system.

Figure 5:
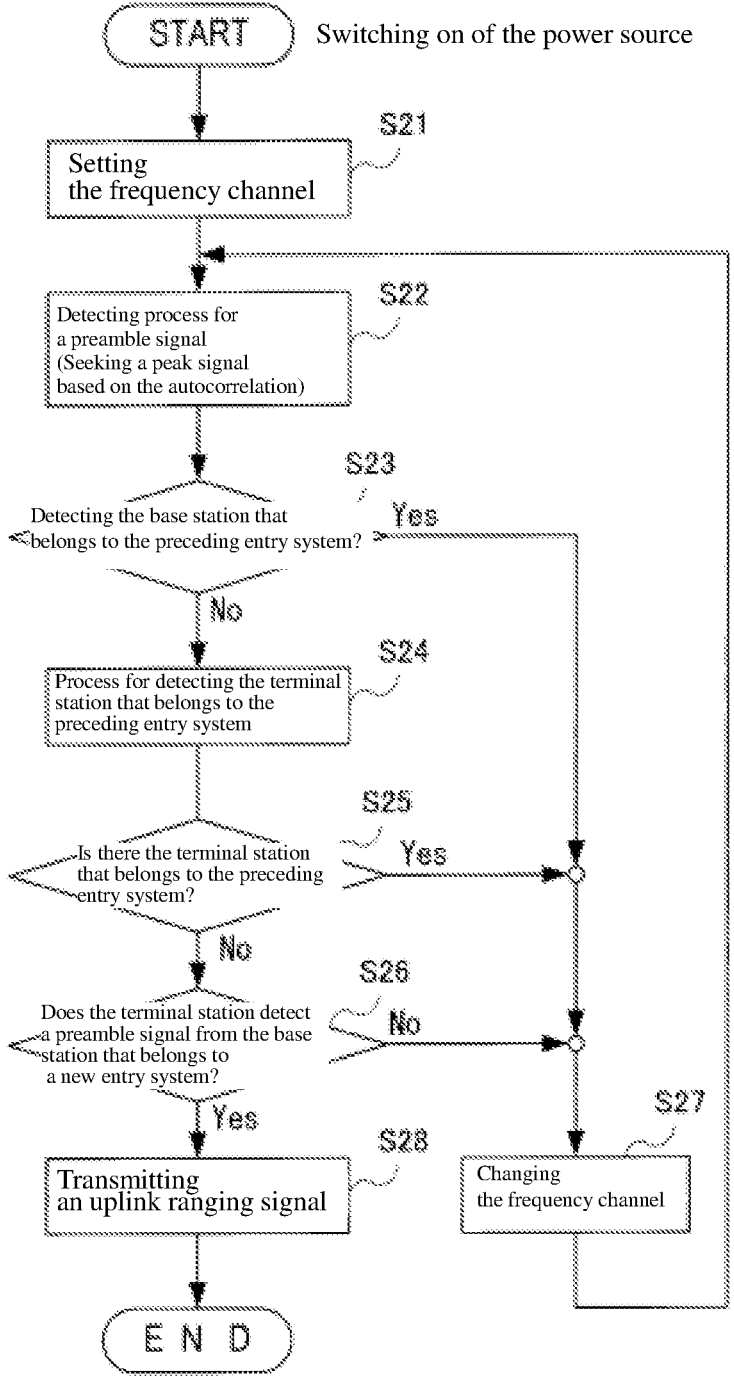
FIG. 5 is a flowchart indicating a startup process in the terminal station 4 in this wireless communication system.

Processing in Terminal Station 40: FIG. 5

Next, a startup process in terminal station 40 for this system will be explained by referring to FIG. 5. FIG. 5 is a flowchart indicating a startup process in terminal station 40 in this wireless communication system.

Terminal station 40 in this system may perform the initializing process described at section 7.14.2 CPE initialization in Non Patent Literature 2. Here, we will explain briefly with extracted characteristic parts. The processes illustrated in FIG. 5 are performed by a control unit in terminal station 40.

As illustrated in FIG. 5, after switching on the power source, terminal station 40 initially sets a frequency channel selected from the list of available frequency channels (The step of S21). Next, by executing a process for detecting preambles, terminal station 40 may detect preambles from a base station that belongs to a preceding entry system, or from base station 30 that belongs to this system (The step of S22).

Though, a base station that belongs to a preceding entry system, being in a general operation, has already been transmitting preambles at the cycle of the length of a frame; a base station that belongs to a new entry system, which has just been initiating an operation, has been transmitting just one preamble every three (3) frames. Therefore, in the step of S22, terminal station 40 can detect preambles or Superframe preambles by referring an autocorrelation signal etc. operated the correlation value of the received signal. Based on the cycle of detected peaks, terminal station 40 can distinguish the existence of a base station that belongs to a preceding entry system from the existence of base station 30 that belongs to this system. The detection of the preambles may be performed in the preamble detection circuit to mention later.

Then, terminal station 40 judges whether terminal station 40 has detected preambles from a base station that belongs to a preceding entry system. When terminal station 40 detects a base station that belongs to a preceding entry system (The judgment result of the step of S23 is "Yes" in FIG. 5), the control procedure will shift to the step of S27 to change the frequency channel.

When terminal station 40 does not detect preambles from a base station that belongs to a preceding entry system in the step of S23 (The judgment result of the step of S23 is "No" in FIG. 5), terminal station 40 tries to detect an uplink signal (for example, a ranging signal), transmitted from other terminal station that belongs to a preceding entry system (The step of S24).

An uplink signal that should be detected, for example, CP, RSSL detected in the process of correlative operation of pilot sub-carrier, a Code Division Multiple Access (CDMA) signal which may transmit at a specific sub-channel in the uplink sub-frame (an uplink ranging signal), or a preamble of CBP burst signal, may be possible.

In the standard of IEEE 802.22, a terminal station should transmit ranging signals periodically, and not only during the period of initialization. In other ranging signals, a band request signal or a reporting signal which reports finding an existing system etc. may be included in the Code Division Multiple Access (CDMA) signal. Terminal station 40 that belongs to the new entry system can be configured to detect these signals.

Then, terminal station 40 judges whether terminal station 40 has detected any uplink signal in the step of S24 (The step of S25). When terminal station 40 detects an uplink signal (The judgment result of the step of S25 is "Yes" in FIG. 5), terminal station 40 determines that there is a terminal station that belongs to a preceding entry system in the neighborhood. The control procedure will shift to the step of S27 to change the frequency channel.

When terminal station 40 does not detect the uplink signal in the step of S25 (The judgment result of the step of S25 is "No" in FIG. 5), based on the correlative operation of the received signal which has been operating from the step of S22, terminal station 40 judges whether terminal station 40 has detected a preamble signal from base station 30 that belongs to a new entry system (the step of S26). When terminal station 40 has not detected a preamble signal from base station 30 that belongs to a new entry system (The judgment result of the step of S26 is "No" in FIG. 5), the control procedure will shift to the step of S27 to change the frequency channel because there may be no available base station which should connect with terminal station 40 using the current frequency channel.

When terminal station 40 detects a preamble signal from base station 30 that belongs to the new entry system in the step of S26 (The judgment result of the step of S26 is "Yes" in FIG. 5), terminal station 40 will shift its operational mode to the general initial operation mode. Thereby terminal station 40 starts transmitting an initial ranging signal (in other words, starts transmitting an uplink ranging signal). (The step of S28)

The procedure for the general initial operation mode is generally described at the section "7.14.2.8.1 CDMA initial ranging and automatic adjustments" in Non Patent Literature 1. Based on the US-MAP which was decoded by the signal, synchronized with the downlink signal from base station 30, terminal station 40 may find the interval of initial ranging signals. Based on the UCD which was also decoded by the signal, terminal station 40 may find information for the initial ranging code, respectively. Then, terminal station 40 randomly selects one ranging code, transmits the code as a ranging signal (RNG-REQ) at the transmit timing, then shifts its operation to the general communication mode.

Based on a Received Signal Strength Indicator (RSSI) of the downlink signal from base station 30 measured at terminal station 40, or an Effective Isotropically Radiated Power (EIRP) indicated by DID decoded by the downlink signal, etc., the appropriate transmission power for transmitting a ranging signal may be determined to allow base station 30 to receive the ranging signal. In other words, even if terminal station 40 transmits the ranging signal according to the transmission power, it is not guaranteed that terminal station 40 does not give interference to other preceding entry system.

It may be ruled in the standard that the ranging signal includes a character string under NMEA0813 format, which is result of a measurement of Global Positioning System (GPS), however, the character string may not be significant under the condition that terminal station 40 cannot access database 1. Therefore, it may be possible that the character string which should be set to the ranging signal is replaced by the character string to express the central neighborhood of the geographical range, where using this system is assumed. In this way, a startup process in terminal station 40 may be executed.

Figure 6:
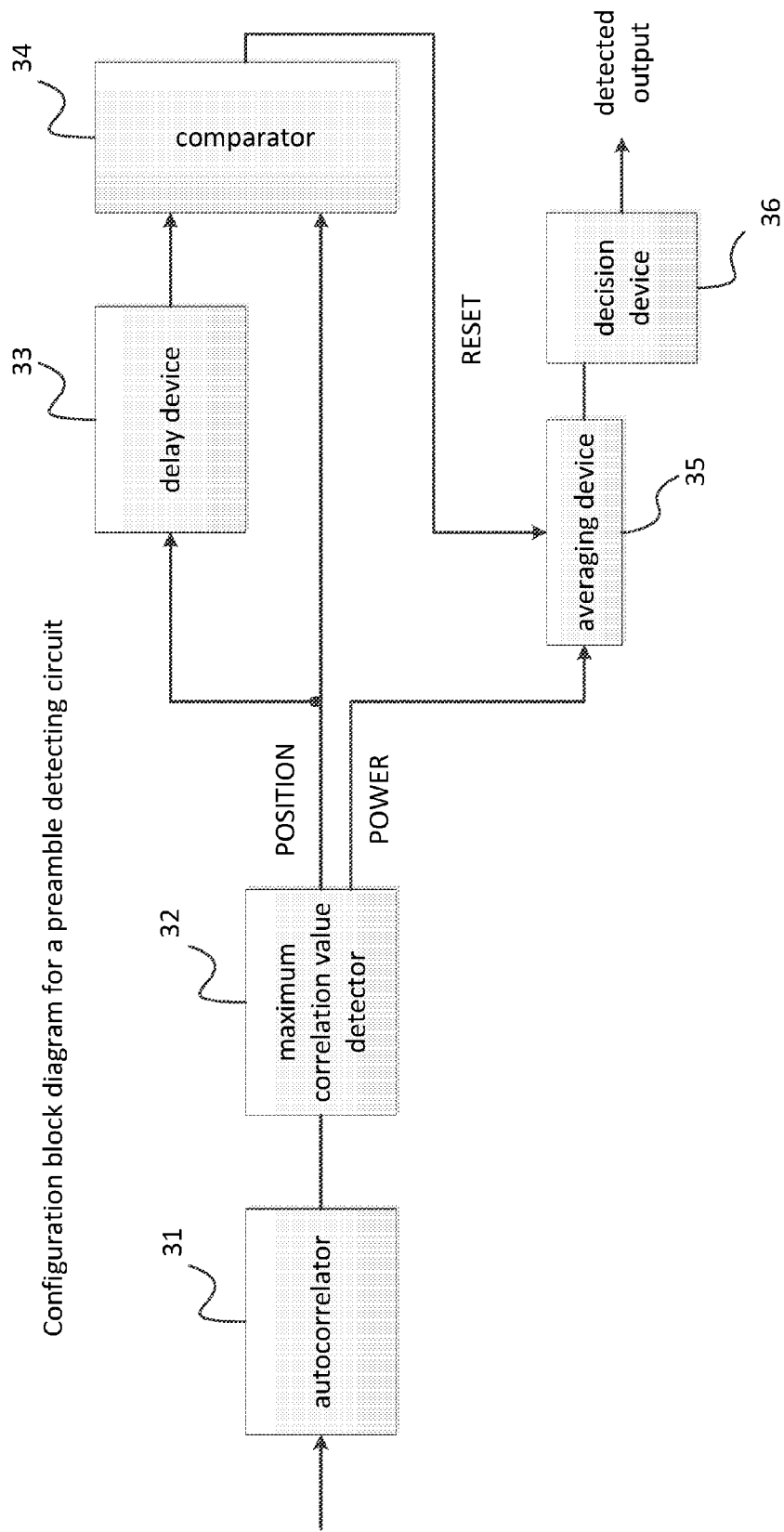
FIG. 6 is a configuration block diagram for a preamble detecting circuit.

Preamble Detecting Circuit: FIG. 6

Next, preamble detecting circuit in base station 30 or terminal station 40 will be described using FIG. 6. FIG. 6 is a configuration block diagram for a preamble detecting circuit 37. The preamble detecting circuit judges the existence of a preamble signal at the cycle of the length of a frame in a received baseband signal, and then outputs the result of the judgment. The preamble detecting circuit may be arranged at a communication part in base station 30 and terminal station 40, respectively. As depicted in FIG. 6, the preamble detecting circuit in base station 30 or terminal station 40 for this system includes autocorrelator 31, maximum correlation value detector 32, delay device 33, comparator 34, averaging device 35, and decision device 36.

Autocorrelator 31 can calculate the autocorrelation of the received preamble signal with a known pattern of the preamble signal previously stored in a memory. The calculated autocorrelation is inputted to maximum correlation value detector 32. Maximum correlation value detector 32 detects maximum value (electric power value) in the specific period (usually, one (1) frame time, for example, 10 ms) and a time-position of the maximum value in the specific period, thereby output them.

Specifically, maximum correlation value detector 32 detects a maximum value of electric power for the first frame time of the received signal, outputs the detected maximum value and the time-position of the detected maximum value, and keeps the detected maximum value and time-position in the internal registers. Thereafter, from the time-position, maximum correlation value detector 32 searches for a maximum value during one (1) frame time. When maximum correlation value detector 32 detects the signal wherein the value of the electrical power of the signal is larger than the value which is multiplied by the previously stored value and the predetermined constant, the previously stored value and the time-position of the stored value are updated by the value of the electrical power and the time-position of the currently detected signal. When maximum correlation value detector 32 does not detect such a signal, maximum correlation value detector 32 judges whether a maximum value (an ultimate value) has been detected during the one (1) frame time, at the time-position where one (1) frame time almost passed. In the state that the maximum value (an ultimate value) has been detected during the one (1) frame time, maximum correlation value detector 32 outputs this maximum value and time-position of the maximum value, and updates the previously memorized maximum value and its time-position by the maximum value and the time-position of the maximum value of current detected signal.

Comparator 34 compares the time-positions between the time-position of the previously detected maximum value which was temporally delayed by delay device 33, and the time-position of the currently detected maximum value. When the time interval of the maximum values is apparently different from one (1) frame length which is expected, averaging device 35 may be reset.

The maximum values outputted from maximum correlation value detector 32 are inputted into averaging device 35, then averaging device 35 averages these maximum values and outputs the averaged value to decision device 36. Decision device 36 judges whether the output signal from averaging device 35 exceeds the predetermined threshold level. When the output signal from averaging device 35 exceeds the predetermined threshold level, decision device 36 outputs the signal which indicates that a preamble is detected. For detecting preambles at the cycle of n-times the length of a frame, a detection period of maximum correlation value detector 32 may be set to n frame times.

By detecting preambles which are illustrated in FIG. 2, base station 30 can detect the existence of the same type of base station that belongs to a preceding entry system, or the same type of terminal station that belongs to a preceding entry system. In addition, as depicted in FIG. 5, based on the detecting cycle of preambles and their value, a control unit for terminal station 40 can distinguish the existence of a base station that belongs to a preceding entry system and a base station that belongs to a new entry system.

Effect of the Embodiments

According to the wireless communication system, as disclosed in the exemplary embodiment, a wireless communication system performs wireless communication between a base station and a terminal station in a one to one response using white space.

At the startup process, base station 30 selects a frequency channel from among the preset frequency channels. Then, base station 30 transmits preambles at the cycle of n-times the length of a frame. (where n is an integer 2 or greater). After base station 30 starts transmitting preambles at the cycle, when base station 30 does not detect a ranging signal from the corresponding terminal station 40 for a prescribed time, base station 30 changes the frequency channel. When base station 30 detects a ranging signal within a prescribed time, base station 30 starts normal operation using the current frequency channel.

At the startup process, terminal station 40 selects the preset frequency channel, then seeks a preamble signal in the receiving signal. When terminal station 40 detects a peak signal every frame length, terminal station 40 changes the preset frequency channel. When terminal station 40 detects peaks at the cycle of n-times the length of a frame, and does not detect peaks at the other cycles, terminal station 40 transmits a ranging signal.

Therefore, by detecting preambles in terminal station 40, terminal station 40 can distinguish a base station that belongs to a preceding entry system and a base station that belongs to the new entry system. Thereby, the wireless communication system can perform the wireless communication without interfering with the preceding entry system, by a simple configuration without using a database or a frequency channel manager.

INDUSTRIAL APPLICABILITY

This disclosure provides a wireless communication system, being capable of avoiding interference between the secondary use systems which do not use databases.

REFERENCE SIGNS LIST 1 database
2 frequency channel manager
3, 30 base station
4, 40 terminal station
31 autocorrelator
32 maximum correlation value detector
33 delay device
34 comparator
35 averaging device
36 decision device

What is claimed is:

1. A method for a startup of a base station to communicate with a terminal station, comprising the steps, in the sequence set forth, of:
   (a) selecting a frequency channel from a plurality of predetermined frequency channels;
   (b) receiving preambles under the frequency channel, wherein in response to the base station receiving preambles at a cycle of a length of a frame under the frequency channel, a base station changes the frequency channel;
   (c) transmitting preambles at a cycle of n-times a length of a frame under the frequency channel, wherein n is an integer 2 or greater;
   (d) in response to the base station not receiving ranging signals under the frequency channel, the base station changes the frequency channel, and returns to step (b); and
   (e) communicating with the terminal station using preambles at the cycle of the length of the frame under the frequency channel.

2. The method according to claim 1, wherein the ranging signals in step (d) correspond to the preambles at the cycle of n-times the length of the frame, wherein n is a same integer specified in step (c).

3. The method according to claim 2, wherein the base station communicates with the terminal station in a one to one response using white space.

4. The method according to claim 1, wherein the base station communicates with the terminal station in a one to one response using white space.

5. A method for a startup of a terminal station to communicate with a base station, comprising the steps, in the sequence set forth, of:
   (a) selecting a frequency channel from a plurality of predetermined frequency channels;
   (b) receiving preambles under the frequency channel, wherein in response to the terminal station receiving preambles at a cycle of a length of a frame under the frequency channel, a terminal station changes the frequency channel;
   (c) in response to the terminal station receiving ranging signals, the terminal station changes the frequency channel, and returns to step (b);
   (d) in response to the terminal station not receiving preambles at a cycle of n-times a length of a frame, wherein n is an integer 2 or greater, the terminal station changes the frequency channel, and returns to step (b); and
   (e) transmitting ranging signals under the frequency channel.

6. The method according to claim 5, wherein the transmitting the ranging signals in step (e) is specified by information included in a downlink signal from the base station, and power of the transmitting the ranging signals in step (e) is controlled so as not to give interference to another preceding entry system.

7. The method according to claim 6, wherein the terminal station communicates with the base station in a one to one response using white space.

8. The method according to claim 5, wherein the terminal station communicates with the base station in a one to one response using white space.

* * * * *